Jan. 14, 1930.　　　F. P. HENRY　　　1,743,213
AUTOMATIC TRAP NEST
Filed Oct. 23, 1928　　　3 Sheets-Sheet 1

Inventor
F. P. Henry
By *Clarence A. O'Brien*
Attorney

Jan. 14, 1930.  F. P. HENRY  1,743,213
AUTOMATIC TRAP NEST
Filed Oct. 23, 1928  3 Sheets-Sheet 2
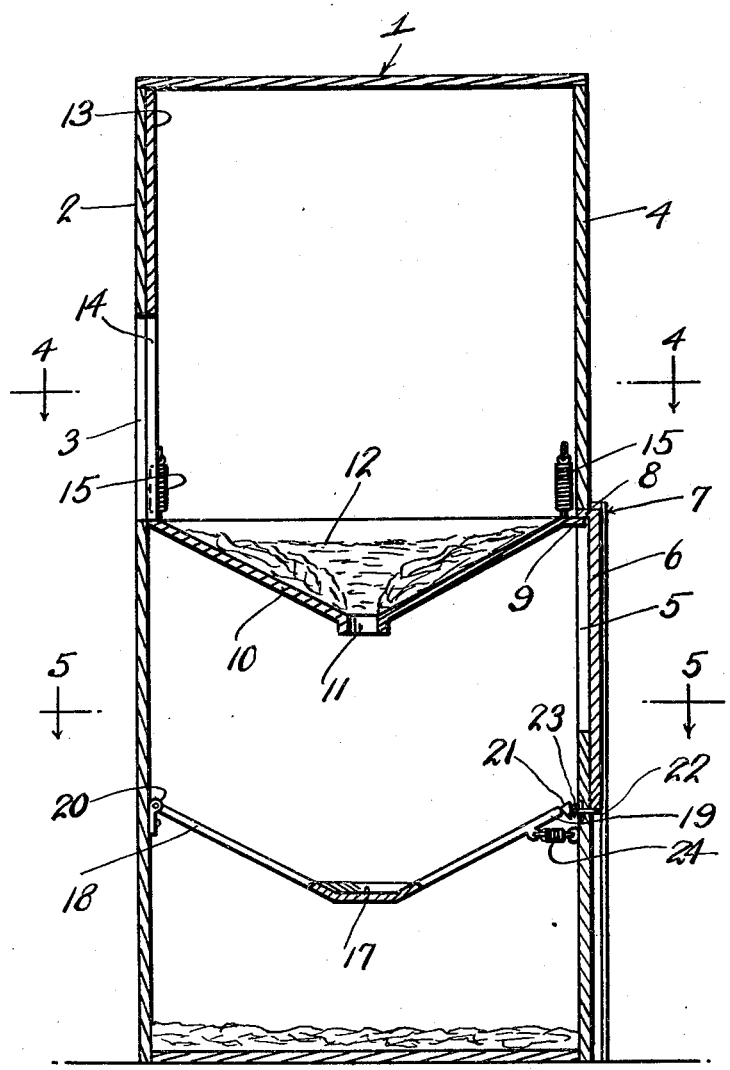
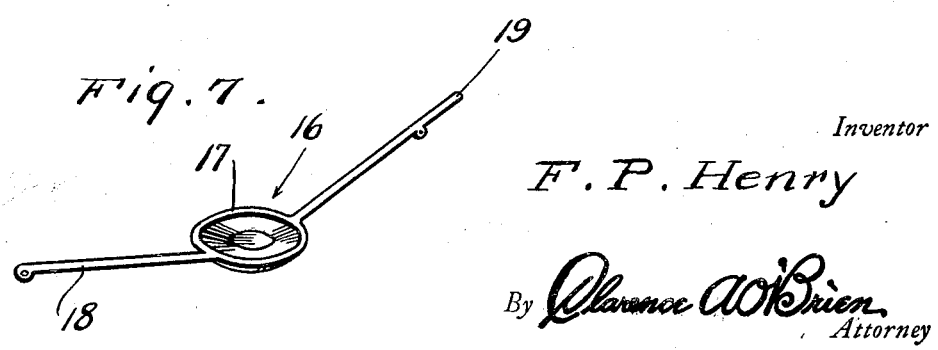
Inventor
F. P. Henry
By Clarence A. O'Brien, Attorney Jan. 14, 1930.   F. P. HENRY   1,743,213
AUTOMATIC TRAP NEST
Filed Oct. 23, 1928    3 Sheets-Sheet 3

Inventor

F. P. Henry

By *Clarence A O'Brien*
Attorney

Patented Jan. 14, 1930

1,743,213

UNITED STATES PATENT OFFICE

FLOYD PERCY HENRY, OF BRADDOCK, NORTH DAKOTA

AUTOMATIC TRAP NEST

Application filed October 23, 1928. Serial No. 314,340.

The present invention relates to improvements in trap nests, and has for its principal object to provide an improved nest having means associated with the nest proper for closing the entrance at the front side of the casing, the closure for the exit being also moved to a closed position by the nest proper; said exit closure being automatically opened by the weight of the eggs laid by the hen occupying the nest.

A further object is to provide a trap nest of the above mentioned character which includes a vertically slidable nest having a door fixedly carried thereby and is formed with an opening which normally communicates with the entrance in the front side of the casing when the nest is in its raised position, the door being adapted to move to a closed position over the entrance when the nest moves downwardly in the casing, the nest being adapted for downward sliding movement by reason of the weight of the hen occupying the same; contractile coil springs being normally connected to the nest for holding the same in its raised position.

Still a further object is to provide a trap nest of the above mentioned character wherein the same includes a pivoted egg receiving unit located below the nest, said unit cooperating with the vertically sliding closure for the exit at the rear side of the casing for effecting the tripping of the plunger rod that engages with the lower edge of said closure whereby said closure will be caused to descend to uncover the exit when the egg drops from the nest onto the egg receiving unit so that the hen in the casing may leave through said exit.

A further object is to provide a trap nest of the above mentioned character that includes cooperating means between the nest and the sliding closure provided for the exit whereby said closure will be raised to cover the exit simultaneously with the upward return movement of the nest after the hen has left the nest.

Still a further object is to provide a trap nest of the above mentioned character which will at all times be efficient and reliable in its operation, the same being simple in construction, inexpensive, strong and durable and further well adapted to the purpose for which it is designed.

Other objects and advantages of the invention will become apparent from the following description when taken in connection with the accompanying drawing.

In the accompanying drawing wherein like reference characters indicate corresponding parts throughout the several views:

Figure 3 is a vertical sectional view taken approximately on the line 3—3 of Figure 1.

Figure 7 is a detail perspective view of the egg receiving unit, and

Figure 1:
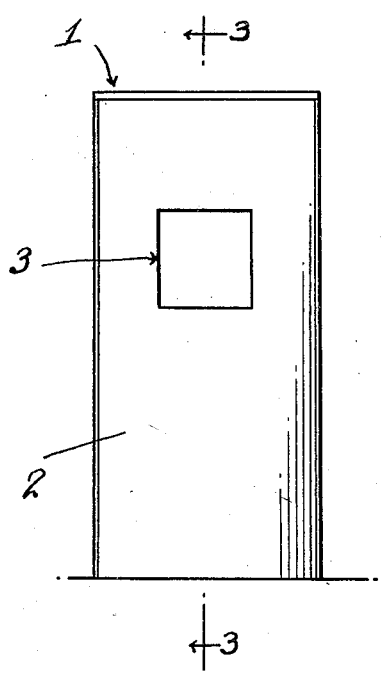
Figure 1 is a front elevation of the automatic trap nest embodying my invention.

In the drawings wherein for the purpose of illustration is shown the preferred embodiment of my invention, the numeral 1 designates a substantially rectangular shaped casing that has formed in its front wall 2, an entrance 3 adjacent the top portion thereof, it being understood of course that a suitable inclined run way may be associated with the entrance to permit hens to have access to the nest that is arranged within the casing. The rear wall 4 is formed with an exit 5 that is located below the entrance 3 and this is more clearly illustrated in Figure 3 of the drawings.

Figure 2:
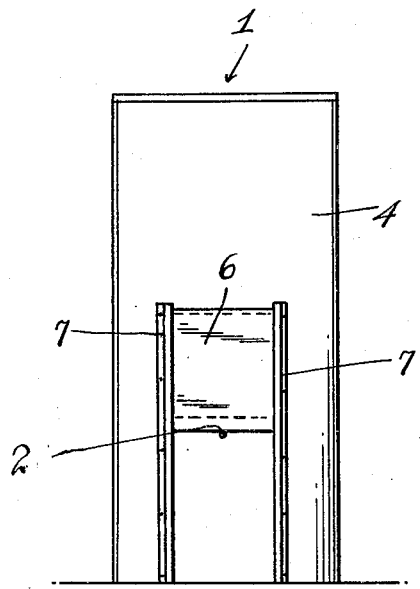
Figure 2 is a rear elevation thereof.

A vertically slidable door 6 provides a closure for the exit 5 and suitable guides 7 are arranged on the outer face of the rear wall 4 of the casing on opposite sides of the exit 5 for cooperation with the sliding door, the guides extending from a point above the exit to the bottom of the casing, as clearly indicated in Figure 2.

Figure 8:
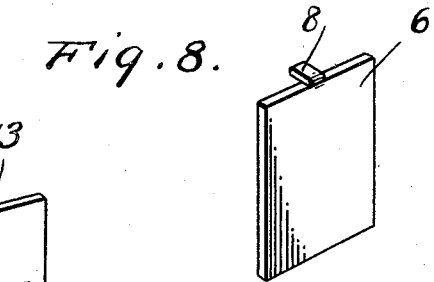
Figure 8 is a similar view of the sliding door provided for the exit at the rear side of the casing.

The door 6 is formed at its upper edge with a forward extending lip 8 as clearly indicated in Figure 8, and the purpose thereof will be presently described.

Forming a salient part of the present invention is the rectangular shaped nest 10 that is arranged for vertical sliding movement within the casing. This nest is of box-like formation, the sides converging gradually toward the center in a downward direction as clearly indicated in Figure 6. An egg discharge opening 11 is formed in the bottom of the nest, and if desired, suitable paddling 12 may be placed wtihin the nest as suggested in Figure 3 to permit a hen to sit comfortably in the nest. A lug 9 extends laterally from the rear side of the nest for cooperation with the laterally extending lip 8 on the door 6 in the manner also to be presently described.

Figure 6:
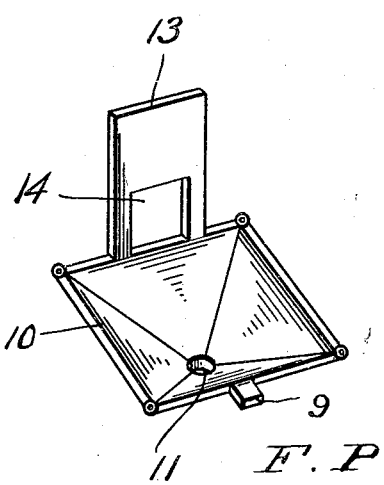
Figure 6 is a perspective view of the nest proper showing the closure for the entrance carried thereby.
Figure 4:
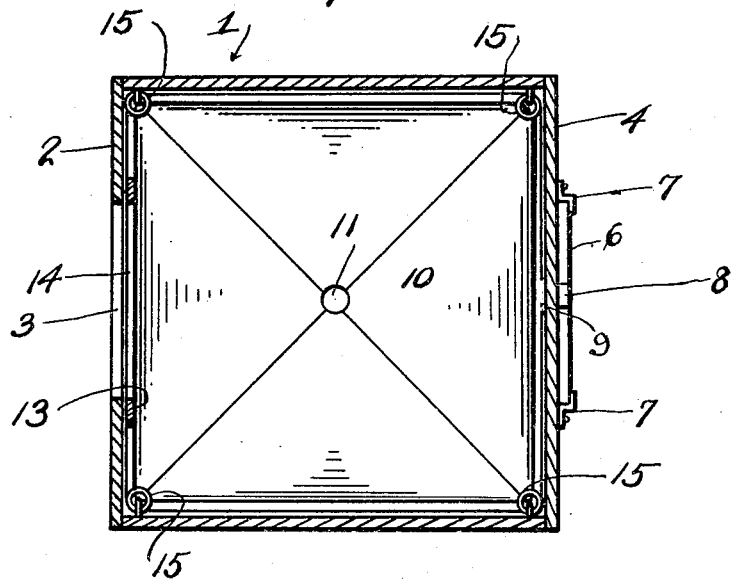
Figure 4 is a transverse section taken approximately on the line 4—4 of Figure 3 looking downwardly.
Figure 5:
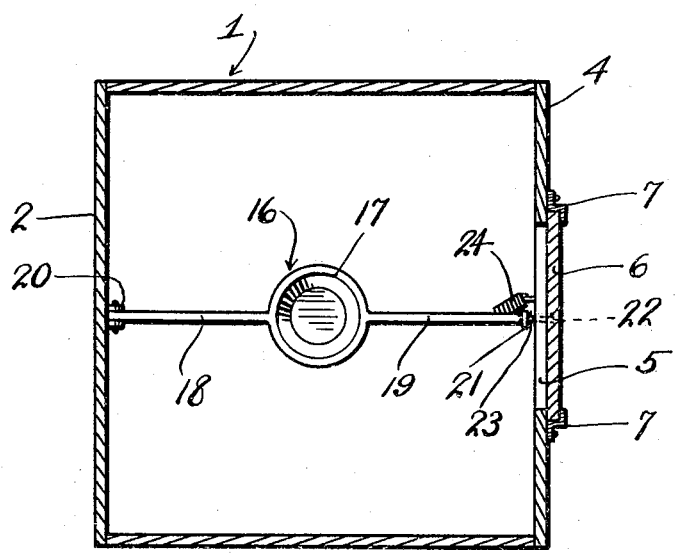
Figure 5 is a similar section taken substantially upon the line 5—5 of the same figure and also looking downwardly.

As is also shown very clearly in Figure 6, a door 13 extends upwardly from the forward side of the rectangular shaped nest 10, and this door is formed with an opening 14 in the lower portion thereof, the opening 14 being of the same size as the entrance 3 formed in the front wall of the casing 1 for cooperation with said entrance.

Retractile coil springs 15 provide a suspension means for the vertically slidable nest 10 and four of such springs are employed, one being secured at its lower end to each corner of the nest, while the upper ends of these springs are connected to the respective sides of the casing in such a maner that the upper edge of the nest normally lies flush with the lower edge of the entrance opening 3, and obviously the entrance opening will be in communication with the opening 14 formed in the door 13 so that a hen may have access to the nest. These springs furthermore cause the lips 8 to be engaged by the lug 9 so that the sliding door 6 for the exit opening 5 will be retained in its raised position and covering the exit as clearly indicated in Figure 3.

The invention further includes the provision of an egg receiving unit denoted generally by the reference character 16 for disposition within the casing 1 below the nest 10. This unit includes an egg receiving pan 17 that may be of any desired shape. An arm 18 extends from the forward side of the pan 17 in an upwardly inclined maner while a similar arm 19 extends from the rear side of the pan in an upwardly inclined manner. The forward end of the arm 18 is pivotally secured to a bracket 20 that is arranged on the inner face of the front wall 2 of the casing.

The outer end of the other arm 19 is adapted to engage with the conical shaped head 21 that is formed on the forward end of the spring pressed plunger rod or latch forming member 22. This plunger rod is arranged for slidable movement through an opening formed in the rear wall 4 of the casing at a predetermined point below the exit 5. The rear or outer end of this plunger rod normally engages with the lower edge of the sliding door 6. A coil spring 23 encircles the plunger rod for normally urging said plunger rod in a forward direction, and when the arm 19 engages with the conical shaped head 21, as shown in Figure 3, this coil spring is held compressed.

A spring 24 is connected at one end to the intermediate portion of the arm 19, and at its opposite end to the rear wall 4 of the casing for normally holding said egg receiving unit 16 in its raised substantially horizontal position.

The operation of my improved trap nest may be briefly stated as follows. Normally the parts are arranged as shown in Figure 3. When a hen enters the casing through the entrance 3 and the opening 14 formed in the front door 13 and occupies the next 10, the weight of the hen will cause the nest to move downwardly in the casing, and such movement will result in the lug 9 being moved away from the lip 8, and at the same time the door 13 will slide downwardly across the entrance 3 thereby closing the same. The nest will travel downwardly in the casing against the tension of the retractile coil springs 15, so that the same will stop at a point above the egg receiving unit and the egg that is laid by the hen will drop through the opening 11 onto the pan 17.

The weight of the egg will cause the downward swinging movement of the egg receiving unit 16 so that the outer end of the arm 19 will move out of engagement with the head 21, and the spring 23 will then project the plunger rod in a forward direction so as to move the outer or rear end portion of the rod out of the path of movement of the sliding door 6. Thus the door 6 will be caused to move downwardly by gravity, whereby to uncover the exit 5 and when the exit is uncovered, the hen may leave the nest through said exit.

When the hen leaves the nest the springs 15 will return the nest to its normally raised position whereupon the opening 14 will again be brought into registration with the entrance opening 3. Simultaneously the lug 9 will cooperate with the lip 8 to raise the door 6 to again cover the exit 5. The spring 24 will in the meantime be placed under tension, and after the egg has rolled off of the pan into the padded bottom of the casing, said spring 24 will swing the egg receiving unit 16 upwardly so that the outer end of the arm 19 will engage with the conical head 21 and force the spring pressed plunger rearwardly so that the outer or rear end of the plunger rod will engage again with the lower edge of the door 6. In this manner, the trap will be reset for further use.

It will thus be seen from the foregoing description, that I have provided an automatic trap nest that will at all times be efficient and reliable in its operation, and due to its simplicity, the same can be constructed at a very low cost and yet be strong and durable.

While I have shown the preferred embodiment of my invention, it is to be understood that minor changes in the size, shape and arrangement of parts may be resorted to without departing from the spirit of the invention, and the scope of the appended claims.

Having thus described the invention, what I claim as new and desire to secure by Letters Patent is:—

1. A trap nest of the class described comprising a casing having an entrance and an exit, a vertically movable nest arranged within the casing, an entrance closure carried by the nest and being normally disposed in an inoperative position when the nest is in its raised position, suspension means for the nest to normally hold the same raised, said closure being disposed in an operative position to cover the entrance when the nest is moved downwardly in the casing by the weight of the hen occupying the same, an egg receiving unit arranged within the casing below the nest, an exit closure, a latch member for holding the exit closure in a raised position over the exit, and cooperating means between the latch and the egg receiving unit for releasing the latch and to permit the exit closure to move downwardly to an inoperative position when an egg is dropped onto the egg receiving unit from the nest, said nest suspension means comprising retractile coil springs connected at their lower ends to the nest and at their upper ends to the respective ends of the casing, and cooperating means between the nest and the exit closure for returning the latter to its normal operative position over the exit after the hen leaves the nest and as said retractile coil springs return the nest to its normally raised position, said last mentioned cooperating means including a lip extending laterally from the upper edge portion of the exit closure, and a lug extending laterally from the nest for engagement with the under side of the lip.

2. In a trap nest of the class described, a casing provided with an entrance in the front wall, and an exit in the rear wall thereof, the exit being located below the entrance, a vertically movable nest arranged within the casing, retractile coil springs normally supporting the nest in its raised position for disposition adjacent the lower edge of the entrance, an entrance closure carried by the nest and normally disposed in an inoperative position, a vertically slidable exit closure normally disposed in an operative position for covering the exit, a latch arranged for cooperation with the lower edge of the exit closure to normally support the same in a raised operative position, an egg receiving unit arranged below the nest and including an egg receiving pan, arms extending radially from the front and rear sides of the pan, the forward arm being pivotally secured at its outer end to the front wall of the casing, the rear arm being normally in engagement with said latch to hold the same in an operative position, said latch being released to permit the exit closure to be lowered to an inoperative position when an egg drops into the pan and swings the rear arm out of engagement with the latch, the entrance closure being automatically moved to an operative position when the nest moves downwardly against the tension of the coil springs under the weight of the hen occupying the nest.

3. In a trap nest of the class described, a casing provided with an entrance in the front wall, and an exit in the rear wall thereof, the exit being located below the entrance, a vertically movable nest arranged within the casing, retractile coil springs normally supporting the nest in its raised position for disposition adjacent the lower edge of the entrance, an entrance closure carried by the nest and normally disposed in an inoperative position, a vertically slidable exit closure normally disposed in an operative position for covering the exit, a latch arranged for cooperation with the lower edge of the exit closure to normally support the same in a raised operative position, an egg receiving unit arranged below the nest and including an egg receiving pan, arms extending radially from the front and rear sides of the pan, the forward arm being pivotally secured at its outer end to the front wall of the casing, the rear arm being normally in engagement with said latch to hold the same in an operative position, said latch being released to permit the exit closure to be lowered to an inoperative position when an egg drops into the pan and swings the rear arm out of engagement with the latch, the entrance closure being automatically moved to an operative position when the nest moves downwardly against the tension of the coil springs under the weight of the hen occupying the nest, and cooperating means between the nest and the exit closure for returning the latter to its normally raised operative position to cover the exit after the hen leaves the nest.

In testimony whereof I affix my signature.

FLOYD PERCY HENRY.